US011558391B2

(12) United States Patent
Tamura

(10) Patent No.: US 11,558,391 B2
(45) Date of Patent: Jan. 17, 2023

(54) SYSTEM, CONTROL METHOD, AND STORAGE MEDIUM

(71) Applicant: CANON KABUSHIKI KAISHA, Tokyo (JP)

(72) Inventor: Yu Tamura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 16/985,084

(22) Filed: Aug. 4, 2020

(65) Prior Publication Data

US 2021/0044594 A1 Feb. 11, 2021

(30) Foreign Application Priority Data

Aug. 7, 2019 (JP) .............................. JP2019-145572

(51) Int. Cl.
*G06F 15/16* (2006.01)
*H04L 9/40* (2022.01)

(52) U.S. Cl.
CPC .......... *H04L 63/102* (2013.01); *H04L 63/104* (2013.01); *H04L 63/1408* (2013.01)

(58) Field of Classification Search
CPC ... H04L 63/102; H04L 63/101; H04L 63/105; H04L 63/18; H04L 63/02; H04L 63/104; H04L 63/14; H04L 63/1408; H04L 63/1458
USPC ............................... 709/220, 224, 227, 228
See application file for complete search history.

(56) References Cited

U.S. PATENT DOCUMENTS

| | | | | |
|---|---|---|---|---|
| 7,852,195 | B2 * | 12/2010 | Costa ..................... | G06Q 30/06 340/5.8 |
| 8,063,736 | B2 * | 11/2011 | Costa ..................... | G06F 21/36 340/5.8 |
| 8,424,075 | B1 * | 4/2013 | Walsh ................. | H04L 63/0263 726/14 |
| 9,264,436 | B2 * | 2/2016 | Canning ................ | H04L 63/10 |
| 9,571,484 | B2 * | 2/2017 | Doyle ................. | H04L 63/0435 |
| 9,967,253 | B2 * | 5/2018 | Tamura ............... | H04L 63/0853 |
| 9,996,576 | B2 * | 6/2018 | Anderson ............. | G06F 16/245 |
| 10,351,100 | B1 * | 7/2019 | Hentschel ............. | B60R 25/243 |
| 10,616,211 | B2 * | 4/2020 | Jones ..................... | G06F 16/284 |
| 11,036,401 | B2 * | 6/2021 | Caswell .............. | G06F 21/6218 |
| 11,088,847 | B2 * | 8/2021 | Matsugashita ........ | H04L 63/123 |
| 2008/0184354 | A1 | 7/2008 | Yamazaki | |
| 2008/0191009 | A1 * | 8/2008 | Gressel ................. | H04W 4/021 235/382 |
| 2008/0238611 | A1 * | 10/2008 | Costa ..................... | G06F 21/36 340/5.8 |
| 2011/0101087 | A1 * | 5/2011 | Costa ..................... | G06Q 30/06 358/1.18 |

(Continued)

FOREIGN PATENT DOCUMENTS

CA 2838473 A1 * 5/2010 ............ H04W 48/02
JP 5623234 B2 11/2014

*Primary Examiner* — Khanh Q Dinh
(74) *Attorney, Agent, or Firm* — Canon U.S.A., Inc. IP Division

(57) ABSTRACT

The client makes an authorization start request by designating a resource identifier. An authorization server receiving the authorization start request inquires a resource sever of a resource owner of the designated resource identifier. After resolving the resource owner, the authorization server makes an authorization confirmation request to a user terminal corresponding to the resolved user identifier.

18 Claims, 12 Drawing Sheets

(56) References Cited

U.S. PATENT DOCUMENTS

| | | | |
|---|---|---|---|
| 2013/0185784 A1 | 7/2013 | Tamura | |
| 2014/0230020 A1* | 8/2014 | Mogaki | H04L 9/3213 726/4 |
| 2015/0365399 A1* | 12/2015 | Biswas | H04L 63/0815 726/8 |
| 2016/0044038 A1* | 2/2016 | Kementsietsidis | H04L 47/821 726/7 |
| 2017/0288937 A1* | 10/2017 | Zhang | H04L 9/3213 |
| 2018/0302391 A1* | 10/2018 | Jones | H04L 63/083 |
| 2019/0364035 A1* | 11/2019 | Smolny | H04L 63/108 |
| 2020/0004442 A1* | 1/2020 | Caswell | G06F 3/0659 |

\* cited by examiner

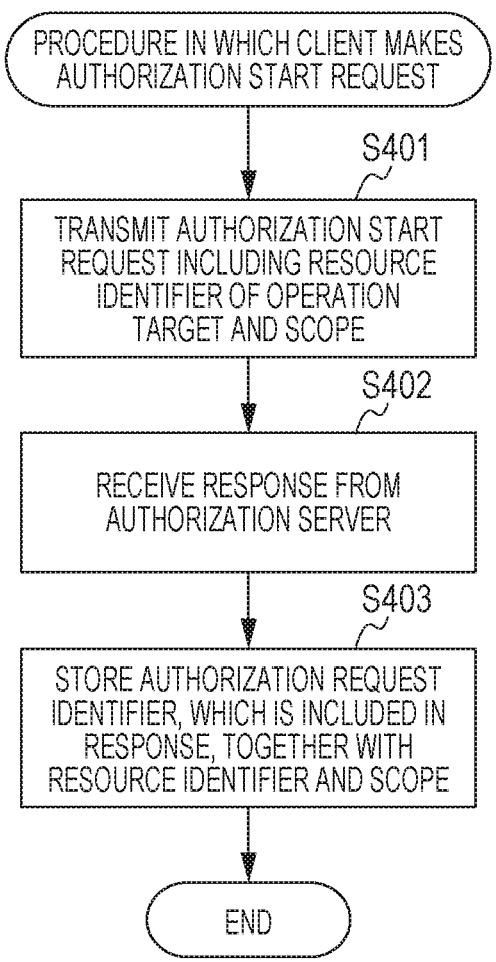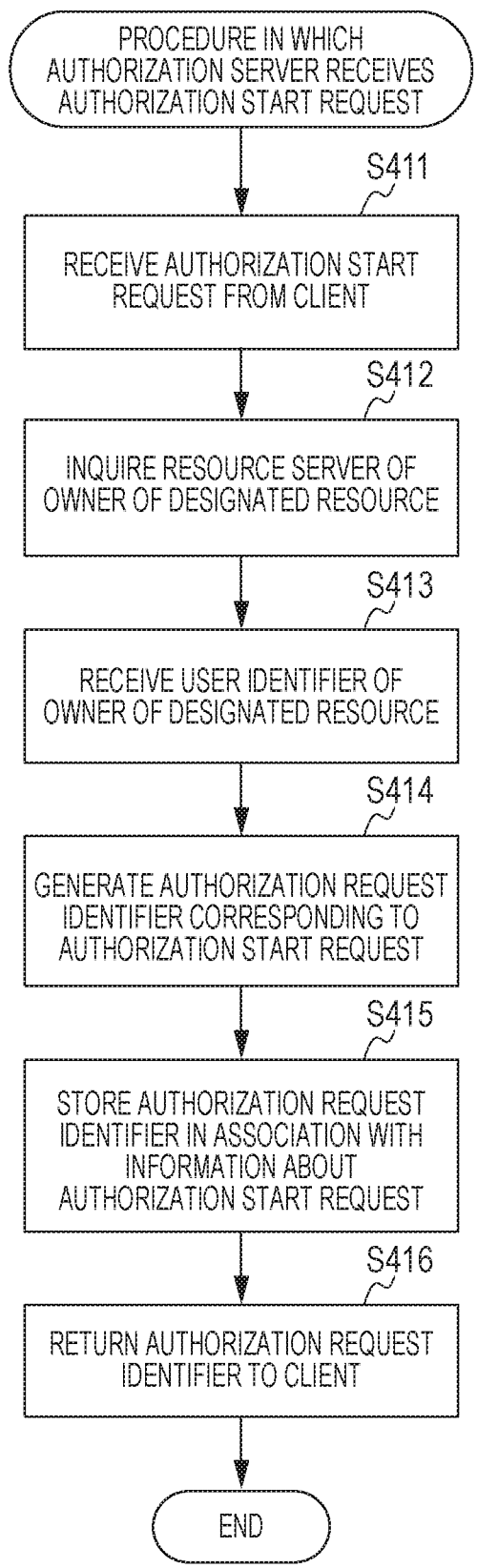

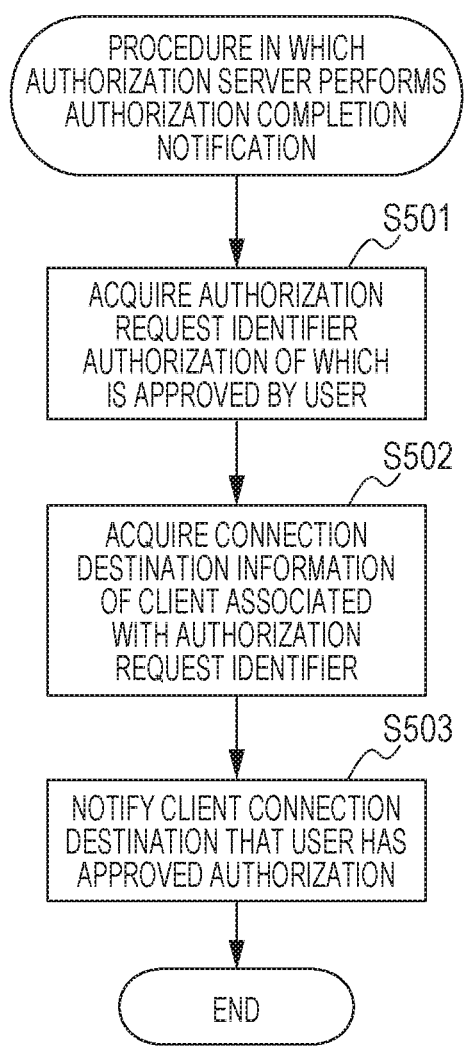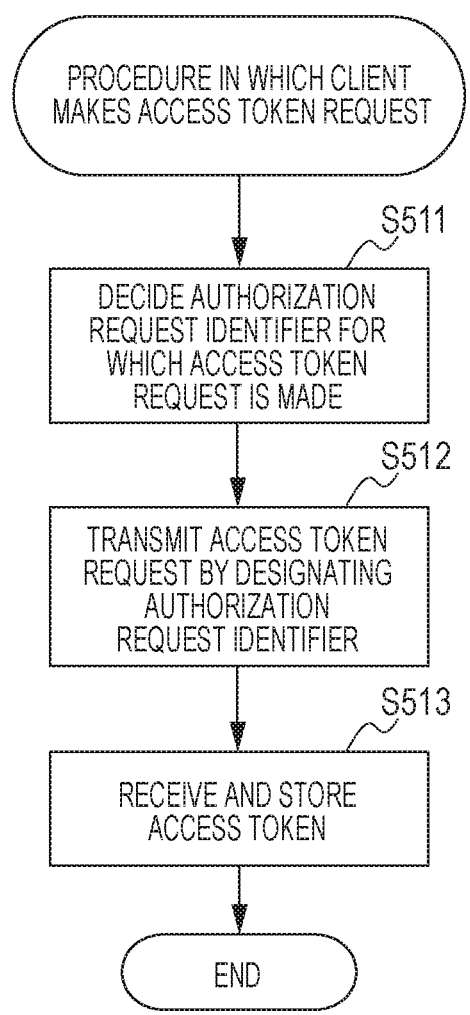

SYSTEM, CONTROL METHOD, AND STORAGE MEDIUM

BACKGROUND

Field of the Disclosure

The present disclosure relates to a system, a control method, and a storage medium that enables delegation of authority of a user resource.

Description of the Related Art

Authority delegation based on OAuth 2.0 is realized in cloud web services. Japanese Patent No. 5623234 discloses that, when setting system cooperation, a user is able to delegate authority of the user to a client by operating both the client and an authorization server with use of a web browser to perform an authorization operation. The client is able to access a resource of the user by using the delegated authority of the user, so that the system cooperation is realized.

For delegating the authority of the user to the client by OAuth 2.0, the user needs to access the client by the web browser. For example, considered is a case where, in a multi-tenant system, permission of managers of tenants is needed to analyze data of the respective tenants from an external system. In this case, it is difficult to expect that a manager of a tenant accesses the external system that is the client at timing of analyzing, so that the client needs to autonomously request delegation of authority.

Moreover, in a case where a user is specified in advance, it is possible to request the user to delegate authority, but considered is a case where a resource that the client desires to access is known but an owner of the resource is not known so that it is difficult to request delegation of authority by designating the user. For example, the problem described above arises in a case where a tenant of which data is to be analyzed is able to be identified but a user who is the manager thereof is unknown.

SUMMARY

In view of the problem described above, the current disclosure enables to request delegation of authority by designating a resource in a case where a client is not able to request delegation of authority by designating an owner of the resource.

An authorization server according to an embodiment of the invention is an authorization server in a system including a resource server that provides a resource of a user, a client that accesses the resource, the authorization server that issues an access token indicating that access to the resource by the client is approved by the user, and a user terminal. The authorization server includes: a reception unit configured to receive an authorization start request that includes a resource identifier corresponding to the resource to be accessed by the client; a transmission unit configured to transmit, to the resource server, a request, which is made to resolve the user who is an owner of the resource corresponding to the resource identifier, together with the resource identifier included in the authorization start request received by the reception unit; a specification unit configured to specify terminal information associated with information about the user acquired as a response to the request; a confirmation unit configured to transmit an authorization confirmation request to the user terminal corresponding to the specified terminal information and receive, as a response, a result of authorization confirmation; and an issuance unit configured to control issuance of the access token in accordance with the result of authorization confirmation received by the confirmation unit and, in a case where the access token is issued, transmit the issued access token to the client that transmitted the authorization start request.

Further features of the present invention will become apparent from the following description of exemplary embodiments with reference to the attached drawings.

BRIEF DESCRIPTION OF THE DRAWINGS

FIG. 4A is a flowchart of an authorization start request and an authorization confirmation request according to the embodiment.

FIG. 4B is a flowchart of an authorization start request and an authorization confirmation request according to the embodiment.

FIG. 5A is a flowchart of issuance of an access token according to the embodiment.

FIG. 5B is a flowchart of issuance of an access token according to the embodiment.

DESCRIPTION OF THE EMBODIMENTS

First Embodiment

Figure 1:
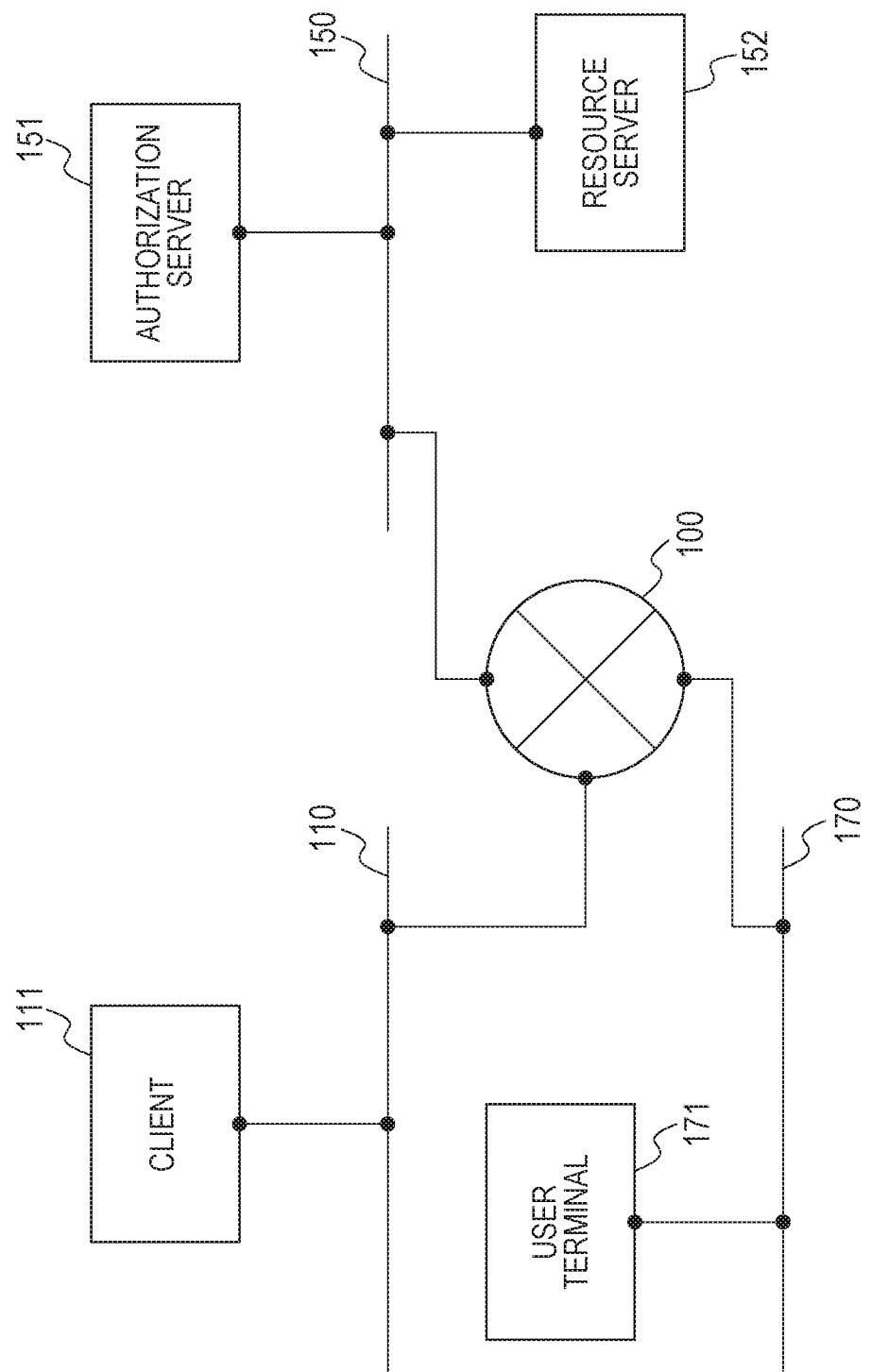
FIG. 1 illustrates a network configuration.

A first embodiment of the invention will be described below with reference to the drawings. An authority delegation system according to the embodiment is implemented on a network having a configuration as illustrated in FIG. 1. In a wide area network 100 (WAN 100), a World Wide Web (WWW) system is constructed in the invention. Local area networks 110, 150, and 170 (LAN 110, LAN 150, and LAN 170) connect components.

A resource server 152 manages a resource of a user and a client 111 accesses the resource on the resource server 152. Here, in order for the client 111 to access the resource on the resource server 152, the user who is an owner of the resource needs to delegate authority to the client 111. An authorization server 151 issues an access token serving as evidence of approval of access to the resource in response to a request of the client 111. A user terminal 171 displays an authorization confirmation screen when the client 111 requests delegation of authority.

The authorization server 151 and the resource server 152 are each connected to the WAN 100 via the LAN 150. Moreover, similarly, the client 111 is connected to the WAN 100 via the LAN 110 and the user terminal 171 is connected to the WAN 100 via the LAN 170. Note that, the authorization server 151 and the resource server 152 may be configured on individual LANs, or may be configured on the same LAN. Similarly, the authorization server 151 and the resource server 152 may be configured on the same PC or server computer. Moreover, each of the authorization server 151 and the resource server 152 is illustrated as a single server in FIG. 1, but may be a server system including a plurality of servers. For example, the authorization server 151 may be constituted by a plurality of clustered servers. Note that, in the invention of the present application, a server system refers to an apparatus that is constituted by at least one server and provides a specific service.

Figure 2:
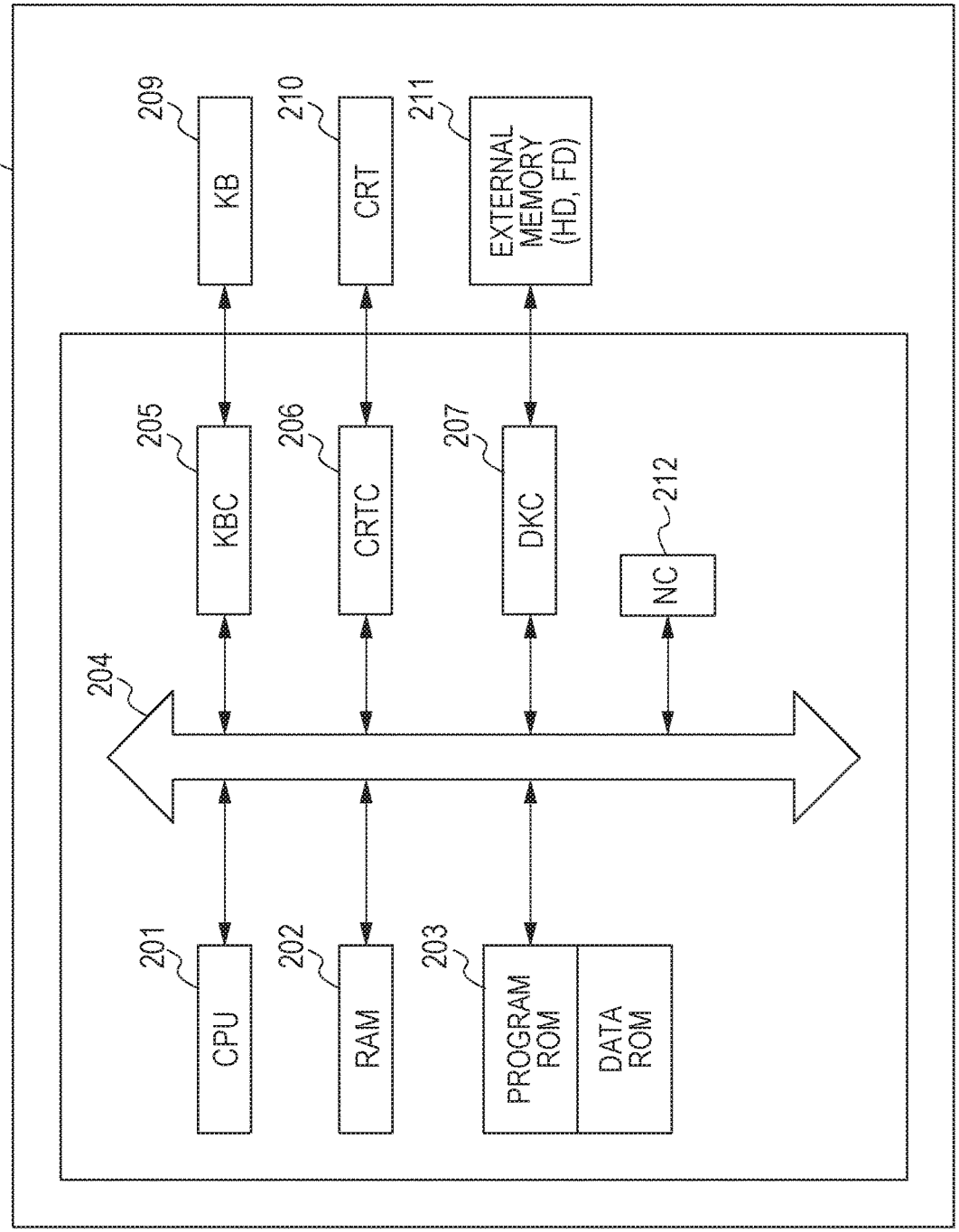
FIG. 2 illustrates a configuration of an authorization server according to a first embodiment.

An event notification system according to the embodiment is implemented on a system including a PC having a configuration as illustrated in FIG. 2. FIG. 2 illustrates a configuration of the authorization server 151 according to the embodiment. Further, configurations of the client 111, the resource server 152, and the user terminal 171 are also similar to the configuration of the authorization server 151. Note that, it is assumed that a hardware block diagram illustrated in FIG. 2 corresponds to a hardware block diagram of a general information processing apparatus, and a hardware configuration of a general information processing apparatus is able to be applied to a server computer or a terminal according to the embodiment.

In FIG. 2, a CPU 201 executes a program, such as an OS or an application, which is stored in a program ROM of a ROM 203 or loaded onto a RAM 202 from a hard disk 211. Here, OS is an abbreviation of an operating system operating on a computer. Hereinafter, the operating system is referred to as OS. Processing of flowcharts described below is achieved by executing the program. The RAM 202 functions as a main memory, a work area, or the like of the CPU 201. A keyboard controller (KBC) 205 controls a key input performed through a keyboard (KB) 209 or a pointing device (not illustrated). A CRT controller (CRTC) 206 controls display of a CRT display 210. A disk controller (DKC) 207 controls access to data in the hard disk (HD) 211, a floppy (registered trademark) disk (FD), or the like for storing various types of data. An NC 212 is connected to a network and executes control processing for communicating with another device connected to the network.

Note that, throughout the description described below, unless otherwise specified, the CPU 201 mainly executes operations in terms of hardware, and application programs installed in the hard disk (HD) 211 mainly execute operations in terms of software. The CPU 201 executing the programs realizes operations in terms of software.

Figure 3A:
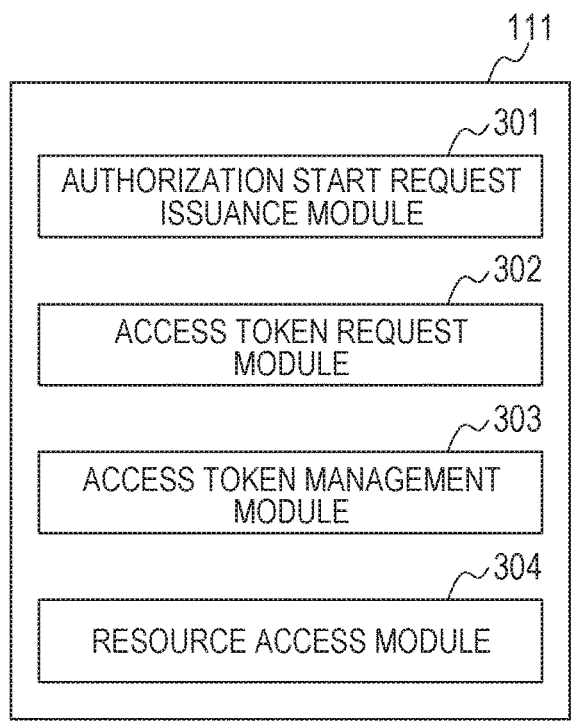
FIG. 3A illustrates a module configuration according to the embodiment.
Figure 3B:
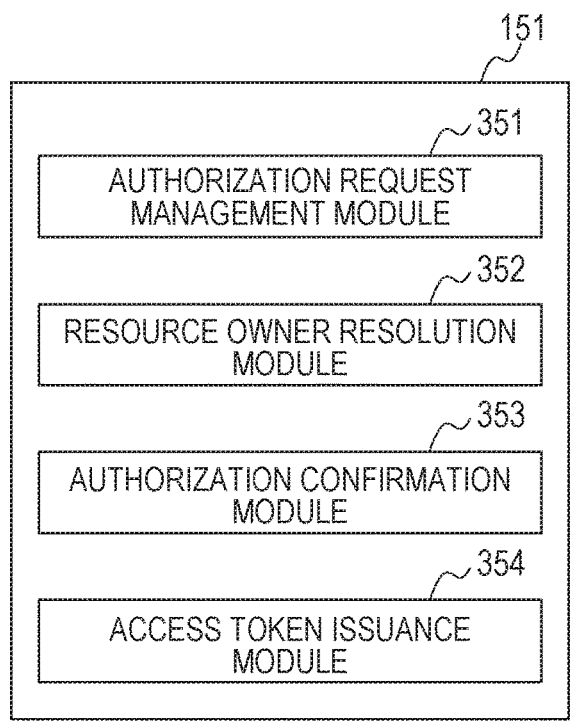
FIG. 3B illustrates a module configuration according to the embodiment.
Figure 3C:
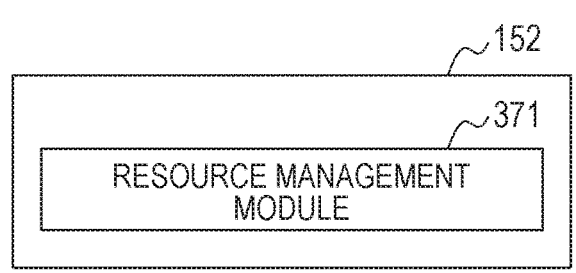
FIG. 3C illustrates a module configuration according to the embodiment.
Figure 3D:
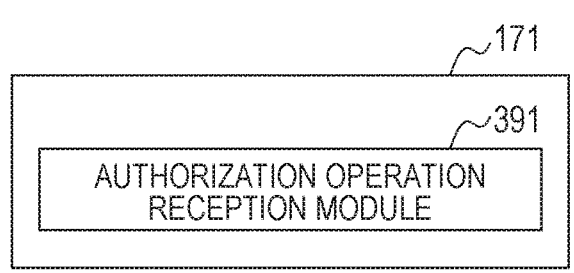
FIG. 3D illustrates a module configuration according to the embodiment.

FIGS. 3A to 3D illustrate module configurations of the client 111, the authorization server 151, and the resource server 152 according to the embodiment. FIG. 3A illustrates a module configuration of the client 111, FIG. 3B illustrates a module configuration of the authorization server 151, and FIG. 3C illustrates a module configuration of the resource server 152. Further, FIG. 3D illustrates a module configuration of the user terminal 171. The client 111 has an authorization start request issuance module 301, an access token request module 302, an access token management module 303, and a resource access module 304. The authorization server 151 has an authorization request management module 351, a resource owner resolution module 352, an authorization confirmation module 353, and an access token issuance module 354. The resource server 152 has a resource management module 371. The user terminal 171 has an authorization operation reception module 391.

The authorization request management module 351 of the authorization server 151 processes an authorization start request in response to a request from the authorization start request issuance module 301 of the client 111. Here, the authorization start request includes information about a resource that the client 111 intends to access. The resource owner resolution module 352 uses the resource information included in the authorization start request to inquire the resource server 152 of resource owner information of the resource. On the basis of the resource owner information obtained here, the authorization confirmation module 353 makes an authorization conformation request to a specific user terminal 171. When a user performs an authorization operation in response to the authorization confirmation request, the client 111 is allowed to acquire an access token from the authorization server 151 and access the resource server 152.

FIG. 4A is a flowchart of procedure in which the client 111 makes an authorization start request to the authorization server 151, according to the embodiment. The procedure starts when an access token is needed before the client 111 accesses a resource on the resource server 152.

At step S401, the authorization start request issuance module 301 transmits, to the authorization server 151, an authorization start request that includes a resource identifier of an operation target and a scope. Here, the scope indicates a range of access to the resource.

At step S402, the authorization start request issuance module 301 receives a response from the authorization server 151. The response includes an authorization request identifier issued by the authorization server 151.

At step S403, the authorization start request issuance module 301 stores the authorization request identifier, which is included in the response received at step S402, together with the resource identifier of the operation target and the scope at step S401, and the procedure ends. Table 1 is an example of an authorization request management table stored by the client 111.

TABLE 1

Authorization request management table

| Authorization request identifier | Resource identifier | Scope | Access token identifier |
|---|---|---|---|
| auth_req_id_12345 | /datalake/iot0010/data | get-data | (Blank) |
| auth_req_id_98765 | /datalake/iot0011/data | get-data | actk111222333 |
| . | . | . | . |
| . | . | . | . |
| . | . | . | . |

In Table 1, an authorization start request made with a scope "get-data" for a resource indicated by a resource identifier "/datalake/iot0010/data" is stored in association with an authorization request identifier "auth_req_id_12345". It is also indicated that an access token indicated by "actk111222333" has already been acquired for an authorization request identifier "auth_req_id_98765". Here, a resource indicated by a resource identifier may indicate one file on a file system, a specific record on a database, or a set of the file and the record.

FIG. 4B is a flowchart of procedure in which the authorization server 151 receives an authorization start request, according to the embodiment. The procedure starts when the authorization server 151 receives the authorization start request from the client 111.

At step S411, the authorization request management module 351 receives the authorization start request from the client 111. Here, the authorization start request includes a client identifier of the client 111 and a resource identifier of an operation target for the client 111.

At step S412, the resource owner resolution module 352 inquires the resource server 152 of an owner of the resource designated at step S411. At step S413, as a response to the inquiry at step S412, the resource owner resolution module 352 receives a user identifier of the owner of the resource designated at step S411. At step S414, the authorization request management module 351 generates an authorization request identifier corresponding to the authorization start request received at step S411.

At step S415, the authorization request management module 351 stores the authorization request identifier, which is generated at step S414, in association with information about an authorization request. Here, the information about the authorization request includes the client identifier, the resource identifier of the operation target, and the scope that are received at step S411, and the user identifier that is received at step S413. Table 2 is an example of an authorization confirmation state management table stored by the authorization request management module 351.

TABLE 2

Authorization confirmation state management table

| Authorization request identifier | Client identifier | Resource identifier | Scope | User identifier | Authorization result |
|---|---|---|---|---|---|
| auth_req_id_12345 | client_xyz | /datalake/iot0010/data | get-data | user_abcde | (Blank) |
| auth_req_id_98765 | client_xyz | /datalake/iot0011/data | get-data | user_abcde | approved |
| auth_req_id_44444 | client_xyz | /datalake/iot0011/data | get-all | user_abcde | disapproved |
| . | . | . | . | . | . |
| . | . | . | . | . | . |
| . | . | . | . | . | . |

In Table 2, an authorization start request that is made with a scope "get-data" by a client indicated by a client identifier "client_xyz" for a resource indicated by a resource identifier "/datalake/iot0010/data" is stored in association with an authorization request identifier "auth_req_id_12345". Moreover, a user identifier "user_abcde" is associated with the authorization request identifier "auth_req_id_12345", which indicates that the user identifier is "user_abcde" as a result of resolving a resource owner of the resource "/datalake/iot0010/data". "(Blank)" of an authorization result of the authorization request identifier "auth_req_id_12345" indicates that a user has not performed an authorization operation yet. On the other hand, an authorization result of an authorization request identifier "auth_req_id_98765" is "approved" and an authorization result of an authorization request identifier "auth_req_id_44444" is "disapproved", which respectively indicate that the user has approved the authorization and that the user has disapproved the authorization.

At step S416, as a response to step S411, the authorization request management module 351 returns, to the client 111, the authorization request identifier generated at step S414, and the procedure ends.

Figure 4C:
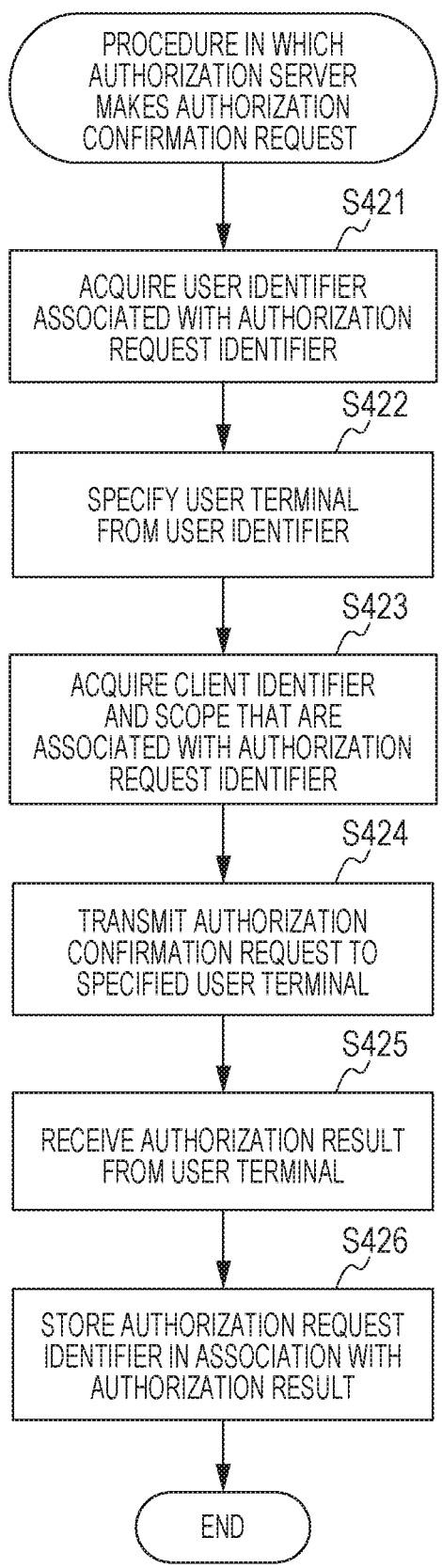
FIG. 4C is a flowchart of an authorization start request and an authorization confirmation request according to the embodiment.

FIG. 4C is a flowchart of procedure in which the authorization server 151 makes an authorization confirmation request, according to the embodiment. The procedure starts when information about the authorization request is stored at step S415.

At step S421, the authorization confirmation module 353 acquires a user identifier associated with the authorization request identifier stored at step S415. Here, when the authorization request identifier stored at step S415 is "auth_req_id_12345", the associated user identifier is "user_abcde".

At step S422, the authorization confirmation module 353 specifies the user terminal 171 from the user identifier acquired at step S421. Table 3 is an example of a user management table in which correspondence between a user identifier and the user terminal 171 is stored.

TABLE 3

| User management table | |
|---|---|
| User identifier | User terminal information |
| user_abcde | 192.168.0.1 |
| user_fghij | 192.168.0.2 |
| user_klmno | 192.168.0.3 |
| user_pqrst | 192.168.0.4 |
| . | . |
| . | . |
| . | . |

Here, it is found that user terminal information corresponding to the user identifier "user_abcde" is "192.168.0.1". In this manner, a user terminal that the user has is specified on the basis of the terminal information. At step S423, the authorization confirmation module 353 acquires a client identifier and a scope that are associated with the authorization request identifier stored at step S415. Here, when the authorization request identifier stored at step S415 is "auth_req_id_12345", the associated client identifier and scope are respectively "client_xyz" and "get-data".

At step S424, the authorization confirmation module 353 transmits, to the user terminal 171 specified at step S422, an authorization confirmation request including the client identifier, the resource identifier, and the scope that are acquired at step S423. Note that, a method of transmitting the authorization confirmation request may be a communication method in which an end point of the user terminal 171 is designated, a method using PUSH notification, such as Message Queuing Telemetry Transport (MQTT), or another method. In any case, communication does not start upon access from the user terminal 171 but communication starts from the authorization confirmation module 353 to the user terminal 171, so that a communication method that allows communication from a server side to a user terminal is required.

Figure 7:
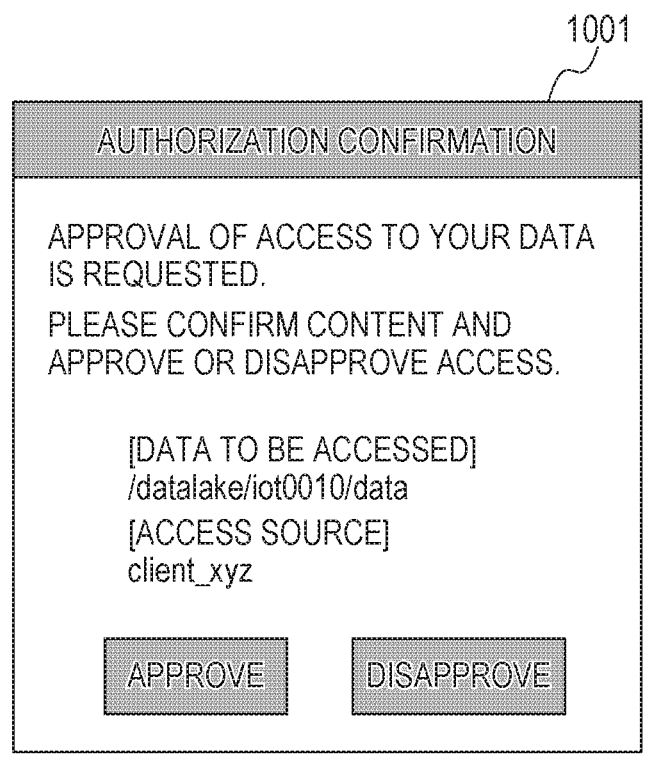
FIG. 7 is an example of an authorization confirmation screen according to the embodiment.

The authorization operation reception module 391 of the user terminal 171 displays an authorization confirmation screen 1001 as illustrated in FIG. 7 on the basis of the acquired authorization confirmation request and requests authorization to the user. A display content is decided by referring to the client identifier and the resource identifier that are included in the authorization confirmation request.

At step S425, the authorization confirmation module 353 receives an authorization result from the user terminal 171 as a response to the authorization confirmation request transmitted at step S424. At step S426, the authorization confirmation module 353 stores the authorization result, which is received at step S425, in association with the authorization request identifier stored at step S415, and the procedure ends. In Table 2, "approved" indicating that the authorization is approved is stored for the authorization request identifier "auth_req_id_98765".

Figure 4D:
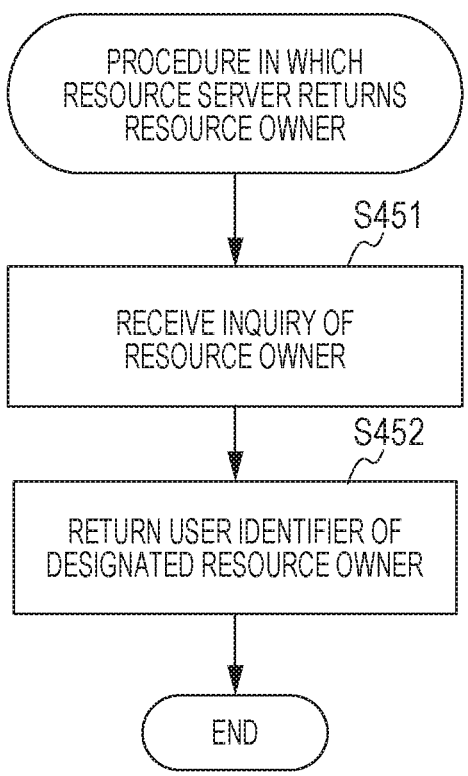
FIG. 4D is a flowchart of an authorization start request and an authorization confirmation request according to the embodiment.

FIG. 4D is a flowchart of procedure in which the resource server 152 returns a resource owner, according to the embodiment. The procedure starts when the resource server 152 receives an inquiry of a resource owner from the authorization server 151.

At step S451, the resource management module 371 receives an inquiry of a resource owner from the authorization server 151. The inquiry includes a resource identifier. At step S452, the resource management module 371 acquires the user identifier of the resource owner designated at step S415 and returns the user identifier to the authorization server 151, and the procedure ends. Table 4 is an example of a resource management table in the resource management module 371. Table 4 indicates that an owner of a resource indicated by a resource identifier "/datalake/iot0010/data" is a user identifier "user_abcde"

TABLE 4

| Resource management table | |
|---|---|
| Resource identifier | User identifier |
| /datalake/iot0010/data | user_abcde |
| /datalake/iot0011/data | user_abcde |
| . | . |
| . | . |
| . | . |

FIG. 5A is a flowchart of procedure in which the authorization server 151 performs authorization completion notification to the client 111, according to the embodiment. The procedure starts when the authorization result is stored at step S426.

At step S501, the authorization confirmation module 353 acquires the authorization request identifier stored at step S426. At step S502, the authorization confirmation module 353 acquires a client end point that is connection destination information of a client associated with the authorization request identifier acquired at step S501. Table 5 is an example of a client management table in which correspondence between a client identifier and a client end point is managed. Table 5 indicates that a client end point of a client identifier "client_xyz" is "10.0.0.1".

TABLE 5

| Client management table | |
|---|---|
| Client identifier | Client end point |
| client_xyz | 10.0.0.1 |
| client_aaa | 10.0.1.1 |
| client_bbb | 10.0.2.1 |
| . | . |
| . | . |
| . | . |

Figure 5C:
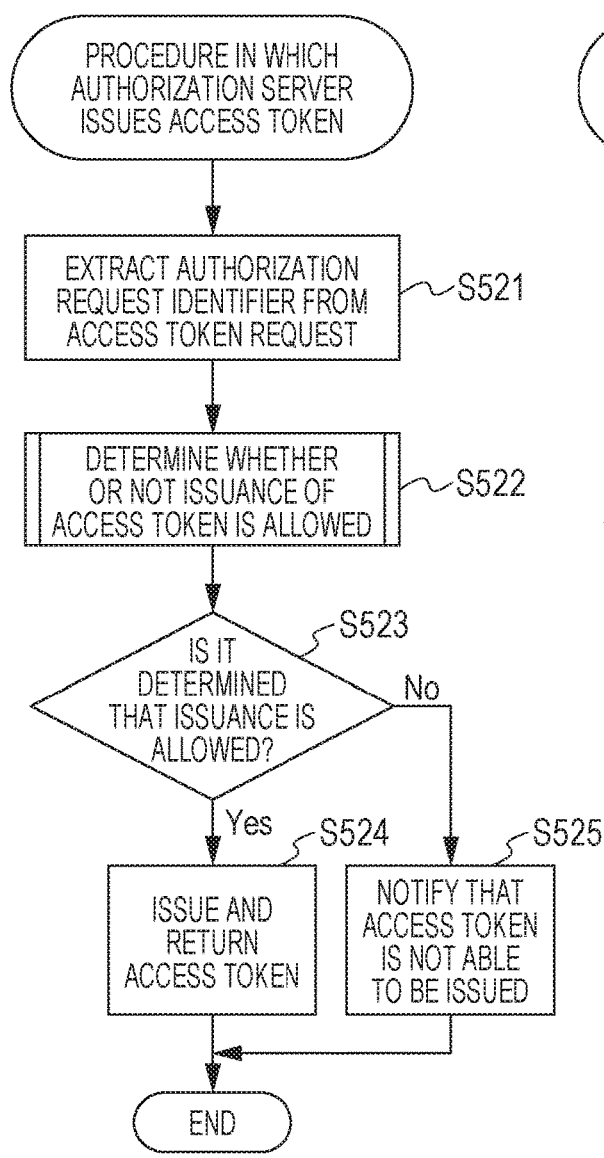
FIG. 5C is a flowchart of issuance of an access token according to the embodiment.

At step S503, the authorization confirmation module 353 notifies the client end point acquired at step S502 that the user has approved the authorization, and the procedure ends. Note that, a content notified here to the client end point may be the authorization request identifier acquired at step S501 or an access token issued in response to the authorization by the user. When the access token is issued, procedure as illustrated in FIG. 5C described later is performed.

FIG. 5B is a flowchart of procedure in which the client 111 makes an access token request to the authorization server 151, according to the embodiment. The procedure starts when the client 111 receives the authorization completion notification at step S503 from the authorization server 151. Alternatively, the procedure may be periodically performed by the client 111.

At step S511, the access token request module 302 decides an authorization request identifier for which an access token request is made. Here, in a case where the procedure is periodically performed, the authorization request identifier is selected from authorization request identifiers, an access token of which is not acquired, in the authorization request management table indicated in Table 1. Alternatively, in a case where the procedure starts upon notification from the authorization server 151, the authorization request identifier included in the notification from the authorization server 151 is used.

At step S512, the access token request module 302 makes an access token request to the authorization server 151 by designating the authorization request identifier decided at step S511. At step S513, the access token management module 303 stores an access token received as a response to step S512, and the procedure ends. Table 1 indicates a state where an access token "actk111222333" acquired for an authorization request identifier "auth_req_id_98765" is stored.

FIG. 5C is a flowchart of procedure in which the authorization server 151 issues an access token, according to the embodiment. The procedure starts when the authorization server 151 receives an access token request from the client 111.

At step S521, the access token issuance module 354 acquires an authorization request identifier from the access token request received from the client 111. At step S522, the access token issuance module 354 determines whether or not to allow issuance of an access token.

At step S523, the access token issuance module 354 checks whether it is determined that issuance of an access token is allowed as a result of step S522. In a case where it is determined that issuance of an access token is allowed, the procedure shifts to step S524. Alternatively, in a case where it is determined that issuance of an access token is not allowed, the procedure shifts to step S525.

At step S524, the access token issuance module 354 issues an access token corresponding to a user identifier and a scope that are associated with the authorization request identifier acquired at step S521. Further, the access token issuance module 354 returns the issued access token to the client 111, and the procedure ends. Table 6 is an example of an access token management table in which an access token issued by the access token issuance module 354 is managed.

TABLE 6

Access token management table

| Access token identifier | User identifier | Scope |
|---|---|---|
| actk111222333 | user_abcde | get-data |
| . | . | . |
| . | . | . |
| . | . | . |

Table 6 indicates that an access token indicating that a user "user_abcde" has delegated authority of a scope "get-data" is issued as an access token identifier "actk111222333". Note that, the access token returned to the client 111 at step S524 may be the access token identifier alone or may be structured data including the user identifier and the scope in addition to the access token identifier. At step S525, the access token issuance module 354 notifies the client 111 that issuance of an access token is not allowed, and the procedure ends.

Figure 5D:
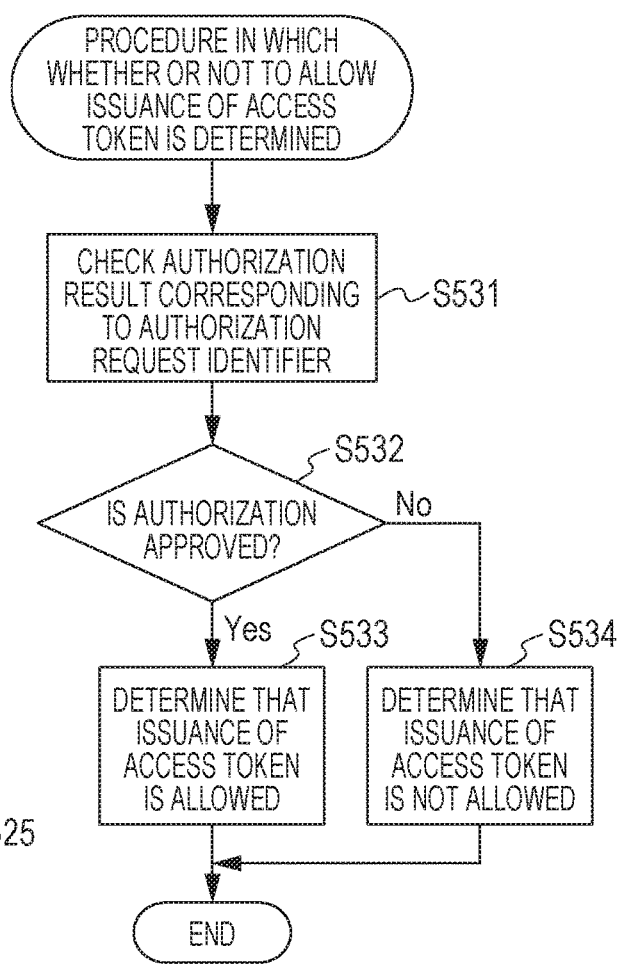
FIG. 5D is a flowchart of issuance of an access token according to the embodiment.

FIG. 5D is a flowchart of detailed procedure of step S522 in which whether or not to allow issuance of an access token is determined, according to the embodiment. At step S531, the access token issuance module 354 checks an authorization result corresponding to the designated authorization request identifier by referring to the authorization confirmation state management table of Table 2.

At step S532, the access token issuance module 354 determines whether the authorization result checked at step S531 indicates that the authorization is approved. In a case where it is indicated that the authorization is approved, the procedure shifts to step S533, and otherwise, the procedure proceeds to step S534. At step S533, the access token issuance module 354 determines that issuance of an access token is allowed, and the procedure ends. At step S534, the access token issuance module 354 determines that issuance of an access token is not allowed, and the procedure ends.

Figure 6:
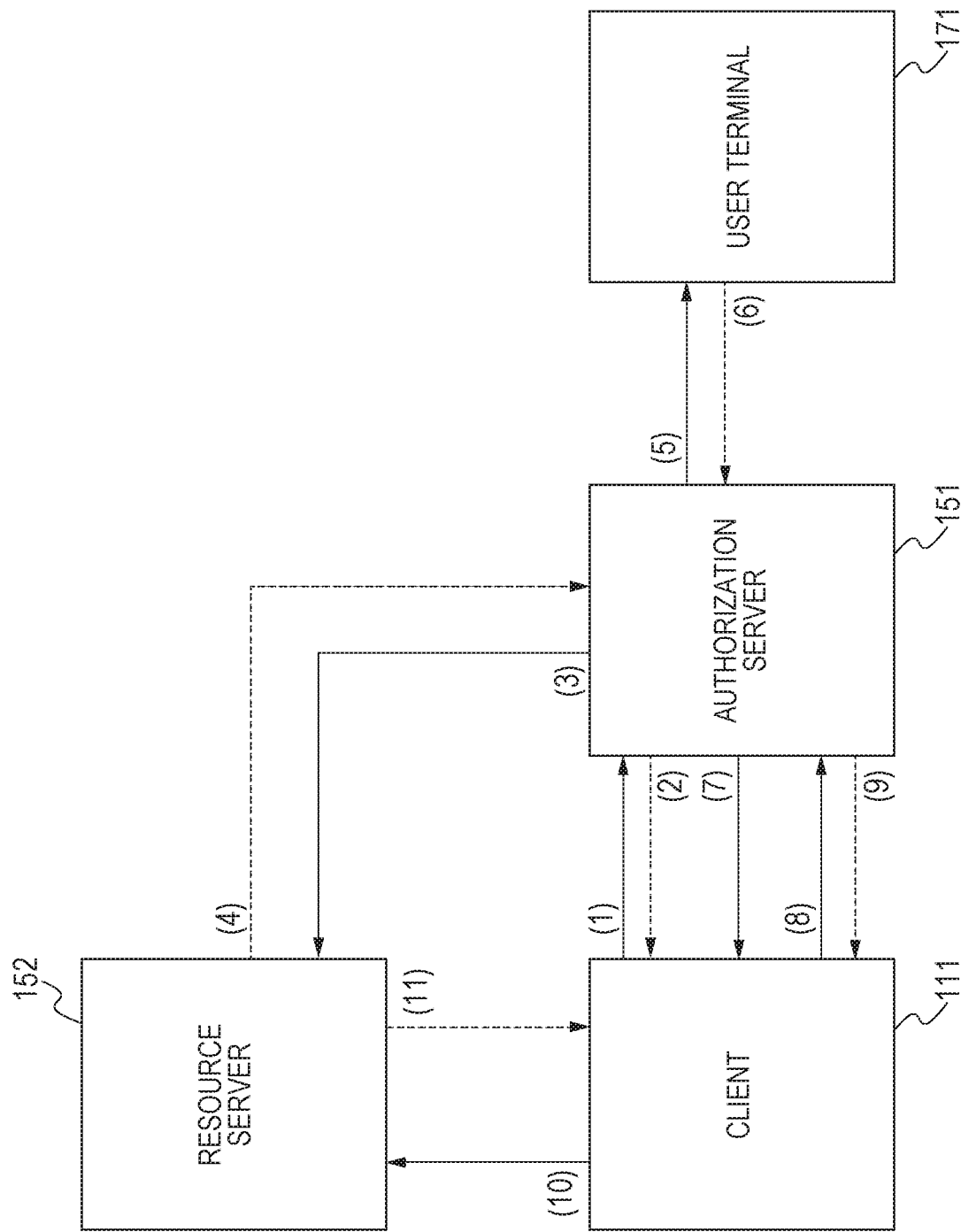
FIG. 6 is an entire flowchart according to the embodiment.

FIG. 6 illustrates an entire flow when the client 111 makes an authorization start request and then obtains an access token to access a resource, according to the embodiment. The client 111 makes an authorization start request to the authorization server 151 in (1), and acquires an authorization request identifier in (2) as a response. (1) corresponds to step S401 and step S411 and (2) corresponds to step S402 and step S416.

Upon reception of the authorization start request, for resolving a resource owner of a resource identifier included in the authorization start request, the authorization server 151 inquires the resource server 152 of the resource owner in (3). Further, as a response, the authorization server 151 receives a user identifier of the resource owner in (4). (3) corresponds to step S412 and step S451 and (4) corresponds to step S413 and step S452.

When the resource owner is resolved, the authorization server 151 makes an authorization confirmation request to the user terminal 171 associated with the resource owner in (5). In the user terminal 171, the authorization confirmation screen 1001 illustrated in FIG. 7 is displayed, and the user performs an authorization operation. A result of performing the authorization operation by the user is returned to the authorization server 151 as (6). (5) corresponds to step S424 and (6) corresponds to step S425. Upon reception of the authorization result in (6), the authorization server 151 performs authorization completion notification to the client 111 in (7). (7) corresponds to step S503.

Upon reception of the authorization completion notification in (7) or periodically, the client 111 makes an access token request to the authorization server 151 in (8). Further, the client 111 receives an access token in (9) as a response. (8) corresponds to step S512 and step S521 and (9) corresponds to step S513 and step S524. The client 111 receiving the access token in (9) performs resource access to the resource server 152 in (10) and acquires a resource in (11) as a response.

According to the embodiment, even in a case where a resource that a client desires to access is known but an owner of the resource is unknown, an authorization start request is able to be made. That is, instead of requesting delegation of authority by designating a user, an access token is able to be acquired by making an authorization start request by designating a resource identifier.

Second Embodiment

Next, a second embodiment of the invention will be described with reference to the drawings. Note that, description for a part common to that of the first embodiment will be omitted and only a different part will be described below. When considering a case where an owner of a resource is changed on a resource server, access to the resource is not to be allowed by an access token issued upon authorization by an owner of the resource before the change.

Figure 8:
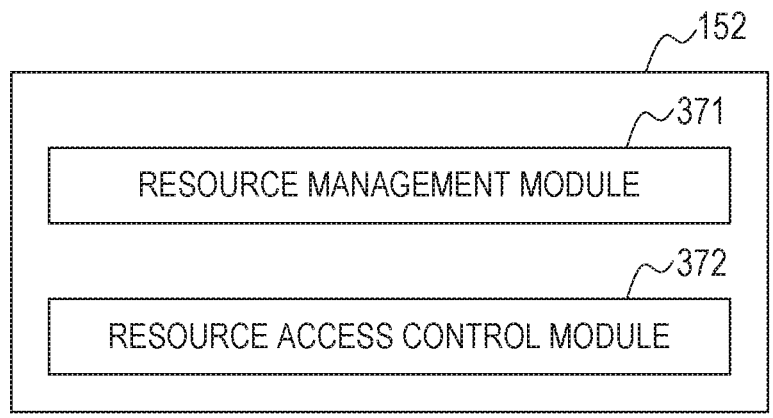
FIG. 8 illustrates a module configuration according to a second embodiment.
Figure 9A:
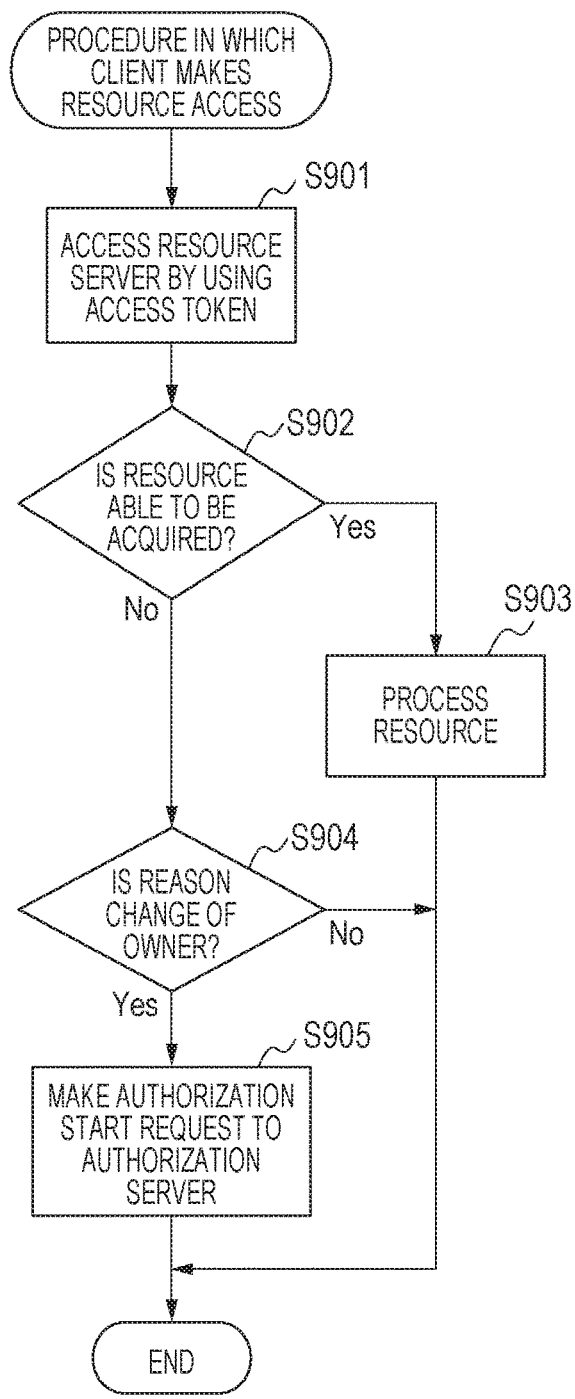
FIG. 9A is a flowchart of resource access according to the second embodiment.

The second embodiment is made in view of the problem described above. FIG. 8 illustrates a module configuration of the resource server 152 according to the second embodiment. The resource server 152 has a resource access control module 372 in addition to the resource management module 371. FIG. 9A is a flowchart of procedure in which the client 111 performs resource access to the resource server 152, according to the second embodiment. The procedure starts when the client 111 acquires an access token.

At step S901, the resource access module 304 performs resource access to the resource serer 152 by using the access token acquired at step S513. Here, the resource access includes the access token and an identifier of a resource of an operation target. Moreover, the access token may include an access token identifier alone or may be structured data including a user identifier and a scope in addition to the access token identifier. Here, it is assumed that the access token is structured data including the user identifier and the scope in addition to the access token identifier. An example of the structured access token is as follows: {"accessTokenId":"actk111222333","userId": "user_abcde", "scope": "get-data"}

At step S902, the resource access module 304 determines whether or not the resource is able to be acquired at step S901. In a case where the resource is able to be acquired, the procedure proceeds to step S903, and in a case where the resource is not able to be acquired, the procedure shifts to step S904. At step S903, the resource access module 304 performs desired processing for the resource acquired at step S901, and the procedure ends.

At step S904, the resource access module 304 determines whether a reason that the resource is not able to be acquired is change of the resource owner. In a case where the reason is the change of the resource owner, the procedure shifts to step S905, and in a case where the reason is another one, the procedure ends.

At step S905, in order to accept delegation of authority of a new owner of the resource, the resource access module 304 makes an authorization start request by designating the resource to be accessed at step S901. The procedure of the authorization start request is as illustrated in FIG. 4A.

Figure 9B:
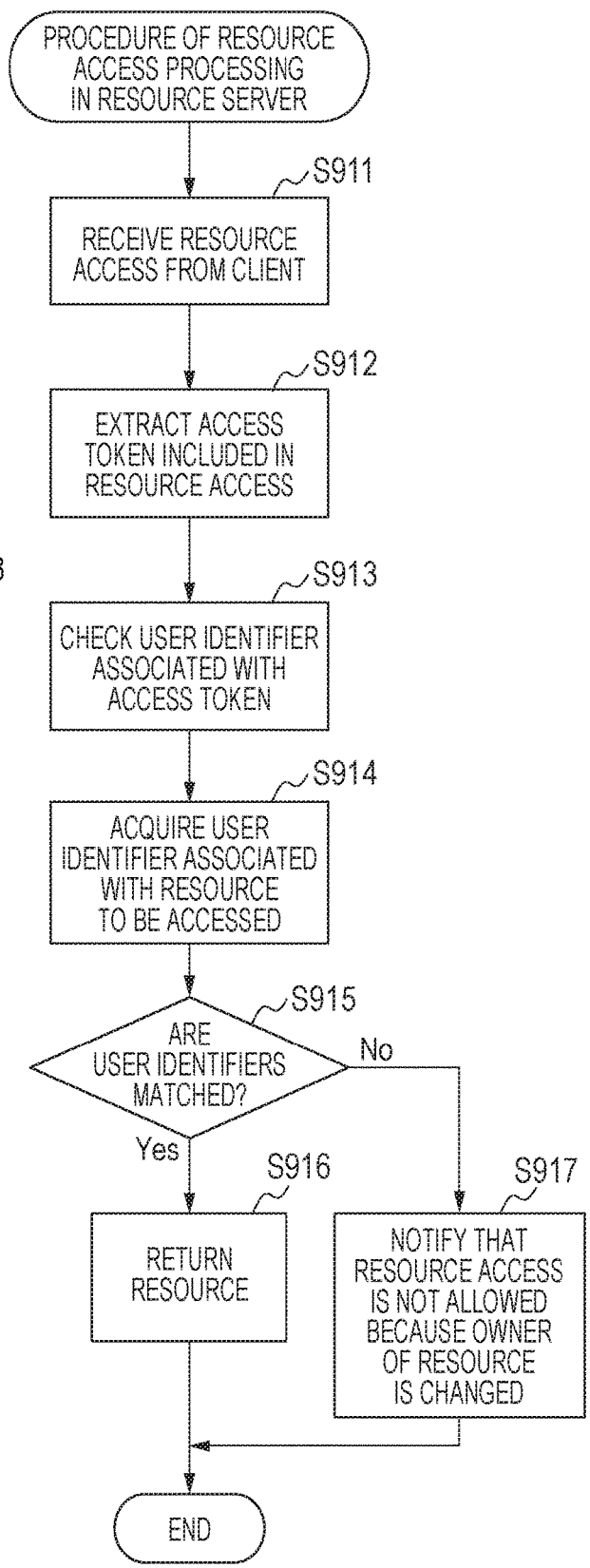
FIG. 9B is a flowchart of resource access according to the second embodiment.

FIG. 9B is a flowchart of procedure of resource access processing in the resource server 152, according to the second embodiment. The procedure starts when the resource server 152 receives resource access from the client 111.

At step S911, the resource management module 371 receives resource access from the client 111. Hereinafter, it is assumed that a resource to be subjected to resource access by the client 111 is a resource indicated by "/datalake/iot0011/data". At step S912, the resource access control modules 372 extracts an access token included in the resource access received at step S911.

At step S913, the resource access control module 372 checks a user identifier associated with the access token extracted at step S912. Here, it is assumed that the access token is structured data and a user identifier directly described in the access token is extracted. When the access token is {"accessTokenId":"actk111222333", "userId": "user_abcde","scope":"get-data"}, "user_abcde" is extracted as the user identifier.

At step S914, the resource access control module 372 acquires a resource owner of the resource to be subjected to the resource access received at step S911. Table 7 indicates an example of a resource management table after the resource owner is changed.

TABLE 7

Resource management table after resource owner is changed

| Resource identifier | User identifier |
|---|---|
| /datalake/iot0010/data | user_abcde |
| /datalake/iot0011/data | user_fghij |
| . | . |
| . | . |
| . | . |

In Table 7, as compared to Table 4 before the resource owner is changed, an owner of the resource indicated by "/datalake/iot0011/data" is changed. A user identifier of the new resource owner is "user_fghij". Here, since the resource that is targeted at step S911 is "/datalake/iot0011/data", the user identifier to be acquired is "user_fghij".

At step S915, the resource access control module 372 compares the user identifier extracted at step S913 to the user identifier extracted at step S914. In a case where both of them are matched, the procedure shifts to step S916, and in a case where both of them are not matched, the procedure shifts to step S917. Here, the respective user identifiers are "user_abcde" and "user_fghij" and are thus determined as being not matched.

At step S916, the resource management module 371 returns the resource to the client 111, and the procedure ends. At step S917, the resource management module 371 notifies the client 111 that resource access is not allowed because the resource owner is changed, and the procedure ends. Note that, here, the client 111 that is notified that resource access is not allowed makes an authorization start request by designating the resource identifier of the resource to be accessed at step S901, in accordance with step S905 of the procedure in FIG. 9A. The procedure of the authorization start request is as illustrated in FIG. 4A.

According to the second embodiment, in a case where an owner of a resource is changed on a resource server, access to the resource with use of an access token issued upon authorization by a resource owner before the change is not allowed, so that security is enhanced.

Third Embodiment

Next, a third embodiment of the invention will be described with reference to the drawings. Note that, description for a part common to that of the first or second embodiment will be omitted and only a different part will be described below.

In a case where timing when authorization is requested to a new owner of a resource after an owner of the resource is changed is set to timing when the client 111 accesses the resource server 152, the following problem arises. That is, the client 111 is not able to access the resource until the new owner of the resource performs an authorization operation.

Figure 10A:
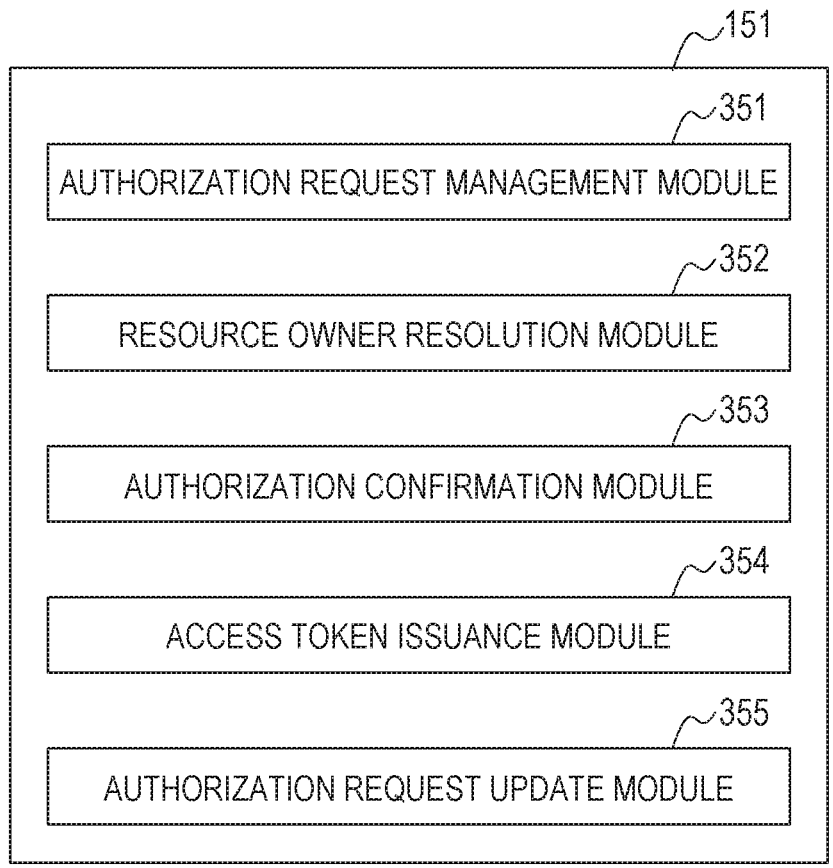
FIG. 10A illustrates a module configuration according to a third embodiment.
Figure 10B:
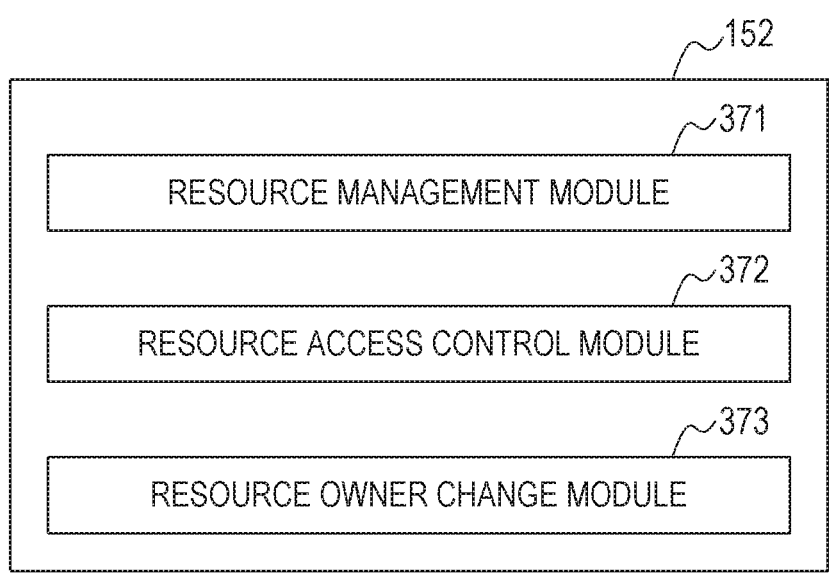
FIG. 10B illustrates a module configuration according to the third embodiment.

The third embodiment is made in view of the problem described above. FIGS. 10A and 10B illustrate module configurations of the authorization server 151 and the resource server 152, according to the third embodiment. FIG. 10A illustrates a module configuration of the authorization server 151 and the authorization server 151 has an authorization request update module 355. FIG. 10B illustrates a module configuration of the resource server 152 and the resource server 152 has a resource owner change module 373.

Figure 11A:
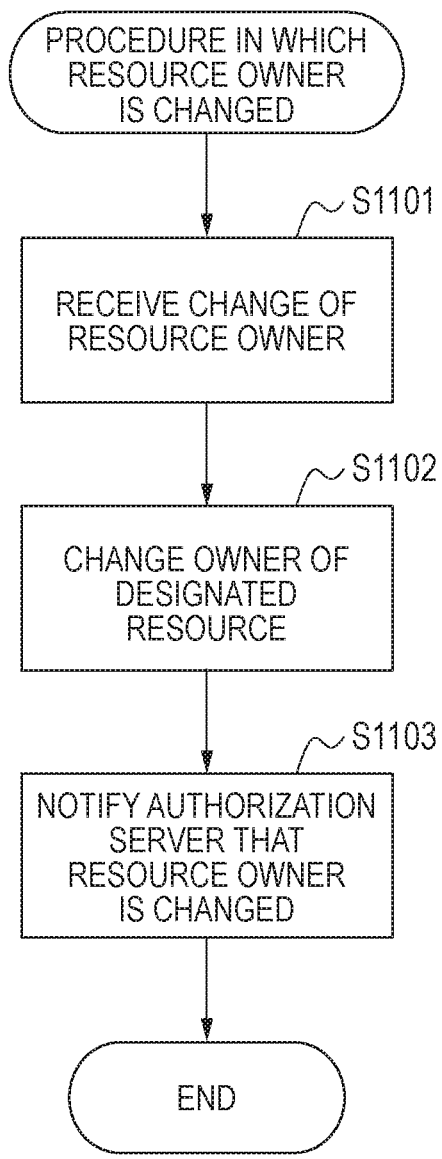
FIG. 11A is a flowchart in which a resource owner is changed, according to the third embodiment.

FIG. 11A is a flowchart of procedure in which a resource owner is changed in the resource server 152, according to the third embodiment. The procedure starts when the resource server 152 receives change of a resource owner.

At step S1101, the resource owner change module 373 receives change of a resource owner. Here, it is assumed that an owner of a resource "/datalake/iot0011/data" is changed to "user_klmno". At step S1102, the resource owner change module 373 changes an owner of the designated resource. Table 8 indicates an example of a resource management table after the resource owner is changed.

is changed. Here, authorization request identifiers "auth_req_id_98765" and "auth_req_id_44444" are extracted.

At step S1113, the authorization request update module 355 updates a user identifier and an authorization result of the authorization request extracted at step S1112. Table 9 is an example of an authorization confirmation state management table after update.

TABLE 9

| | | | | | |
|---|---|---|---|---|---|
| Authorization confirmation state management table after update ||||||
| Authorization request ID | Client identifier | Resource identifier | Scope | User identifier | Authorization result |
| auth_req_id_12345 | client_xyz | /datalake/iot0010/data | get-data | user_abcde | (Blank) |
| auth_req_id_98765 | client_xyz | /datalake/iot0011/data | get-data | user_klmno | (Blank) |
| auth_req_id_44444 | client_xyz | /datalake/iot0011/data | get-all | user_klmno | (Blank) |
| . | . | . | | . | . |
| . | . | . | | . | . |
| . | . | . | | . | . |

TABLE 8

| | |
|---|---|
| Resource management table after resource owner is changed ||
| Resource identifier | User identifier |
| /datalake/iot0010/data | user_abcde |
| /datalake/iot0011/data | user_klmno |
| . | . |
| . | . |
| . | . |

In Table 8, as compared to Table 7, the owner of the resource indicated by "/datalake/iot0011/data" is changed. A user identifier of the new resource owner is "user_klmno". At step S1103, the resource owner change module 373 notifies the authorization server 151 that the resource owner is changed.

Figure 11B:
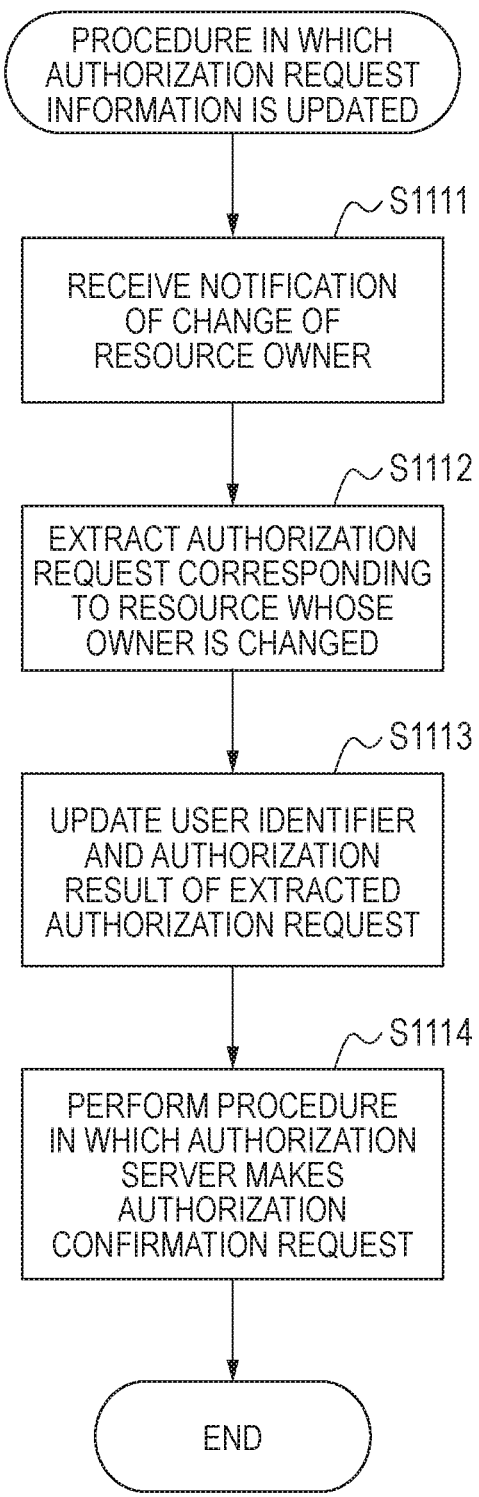
FIG. 11B is a flowchart in which a resource owner is changed, according to the third embodiment.

FIG. 11B is a flowchart of procedure in which an authorization request is updated in the authorization server 151, according to the third embodiment. The procedure starts when the authorization server 151 receives notification of change of the resource owner from the resource server 152. In the first and second embodiments, specification processing of the user terminal 171 and transmission processing of an authorization confirmation request are performed under such condition that an authorization start request is received from the client 111. On the other hand, the third embodiment is characterized in that the specification processing and the transmission processing start upon reception of notification of change, thus making it possible to transmit an access token to the client 111 at timing when an authorization start request is received.

At step S1111, the authorization request update module 355 receives notification of change of the resource owner from the resource server 152. Here, it is assumed that the notification of change of the resource owner indicates that the owner of the resource "/datalake/iot0011/data" is changed to "user_klmno". At step S1112, the authorization request update module 355 extracts, from the authorization confirmation state management table of Table 1, an authorization request corresponding to the resource whose owner In Table 9, in authorization requests in which authorization request identifiers are "auth_req_id_98765" and "auth_req_id_44444", a user identifier indicates "user_klmno". Further, an authorization result indicates "(Blank)". This is because authorization confirmation has not been performed yet for "user_klmno" that is a new resource owner.

At step S1114, the authorization request update module 355 performs the authorization confirmation request procedure illustrated in FIG. 4C for the authorization request updated at step S1113.

Note that, in the authorization confirmation request procedure illustrated in FIG. 4C, the authorization confirmation request is transmitted to the new resource owner. Here, when the new resource owner performs an authorization operation, the authorization server 151 notifies the client 111 that the new resource owner has approved authorization as illustrated in FIG. 5A.

Here, a content of notification may be the authorization request identifier acquired at step S501 or may be an access token issued in response to the authorization by the user. When an access token is issued in advance before notification, the procedure as illustrated in FIG. 5C is performed. Alternatively, the client 111 may transmit an access token request as illustrated in FIG. 5B at any appropriate timing to the authorization server 151. Here, the authorization server 151 issues an access token of the new resource owner when the resource owner associated with the authorization request has been updated in FIG. 11B.

According to the third embodiment, in a case where a resource owner is changed on the resource server, it is possible to rapidly respond to the change. That is, it is possible to make an authorization confirmation request for a new resource owner after change, so that it is possible to complete an authorization operation by a resource owner before an access token request is made by the client 111. Accordingly, convenience is enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-145572, filed Aug. 7, 2019, which is hereby incorporated by reference herein in its entirety.

What is claimed is:

1. An authorization server in a system including a resource server that provides a resource of a user, a client that accesses the resource, the authorization server that issues an access token indicating that access to the resource by the client is approved by the user, the authorization server comprising:
  a first reception unit configured to receive an authorization start request that includes a resource identifier corresponding to the resource to be accessed by the client;
  a transmission unit configured to transmit, to the resource server, a resource owner request including the resource identifier included in the authorization start request received by the first reception unit, wherein the resource owner request is made to resolve the user who is an owner of the resource corresponding to the resource identifier;
  a second reception unit configured to receive, as a response to the resource owner request, information about the user from the resource server;
  a specification unit configured to specify terminal information associated with the received information about the user to request an authorization confirmation;
  a confirmation unit configured to transmit an authorization confirmation request to the terminal corresponding to the specified terminal information and receive, as a response, a result of authorization confirmation; and
  an issuance unit configured to control issuance of the access token in accordance with the result of authorization confirmation received by the confirmation unit and, in a case where the access token is issued, transmit the issued access token to the client that transmitted the authorization start request,
  wherein, in response to receiving a notification of change of the owner of the resource, which is transmitted in a case where the resource is not able to be acquired by the client, the authorization server extracts an authorization request associated with the resource whose owner is changed, identifies new destination, and transmits an authorization confirmation request to the new destination using the confirmation unit.

2. The authorization server according to claim 1 further comprising a storage unit configured to store a user management table in which a user identifier and the terminal information are associated, wherein the specification unit acquires the user identifier as a response to the request and specifies, based on the user management table, the terminal information associated with the acquired user identifier.

3. The authorization server according to claim 1, wherein in a case where the authorization confirmation request is transmitted to the user terminal corresponding to the specified terminal information, the authorization confirmation request is transmitted without access from the user terminal.

4. The authorization server according to claim 1, wherein in a case where the authorization start request is received from the client that is not able to acquire the resource by using the issued access token, the transmission unit transmits the request, which is made to resolve the user who is the owner of the resource, again to the resource server.

5. The authorization server according to claim 1, wherein in a case where notification of change of the owner of the resource is received from the resource server, the authorization confirmation request is transmitted to the user terminal before the authorization start request is received from the client.

6. The authorization server according to claim 5, wherein in a case where the result of the authorization confirmation is received as the response to the authorization confirmation request at timing when the authorization start request is received from the client and it is confirmed that the result of the authorization conformation indicates approval, the access token issued in advance is transmitted.

7. A control method executable by an authorization server in a system including a resource server that provides a resource of a user, a client that accesses the resource, the authorization server that issues an access token indicating that access to the resource by the client is approved by the user, the control method comprising:
  a first reception step of receiving an authorization start request that includes a resource identifier corresponding to the resource to be accessed by the client;
  a transmission step of transmitting, to the resource server, a resource owner request including the resource identifier included in the authorization start request received at the first reception step, wherein the resource owner request is made to resolve the user who is an owner of the resource corresponding to the resource identifier;
  a second reception step of receiving, as a response to the resource owner request, information about the user from the resource server;
  a specification step of specifying terminal information associated with the received information about the user to request an authorization confirmation;
  a confirmation step of transmitting an authorization confirmation request to the terminal corresponding to the specified terminal information and receiving, as a response, a result of authorization confirmation; and
  an issuance step of controlling issuance of the access token in accordance with the result of authorization confirmation received at the confirmation step and, in a case where the access token is issued, transmitting the issued access token to the client that transmitted the authorization start request,
  wherein, in response to receiving a notification of change of the owner of the resource, which is transmitted in a case where the resource is not able to be acquired by the client, the authorization server extracts an authorization request associated with the resource whose owner is changed, identifies new destination, and transmits an authorization confirmation request to the new destination.

8. The method according to claim 7 further comprising a storage step of causing the authorization server to store a user management table in which a user identifier and the terminal information are associated, wherein at the specification step, the user identifier is caused to be acquired as a response to the request and the terminal information associated with the acquired user identifier is caused to be specified based on the user management table.

9. The method according to claim 7, wherein in a case where the authorization confirmation request is transmitted to the user terminal corresponding to the specified terminal information, the authorization confirmation request is caused to be transmitted without access from the user terminal.

10. The method according to claim 7, wherein in a case where the authorization start request is received from the client that is not able to acquire the resource by using the issued access token, at the transmission step, the request that is made to resolve the user who is the owner of the resource is caused to be transmitted again to the resource server.

11. The method according to claim 7, wherein in a case where notification of change of the owner of the resource is received from the resource server, the authorization confirmation request is caused to be transmitted to the user terminal before the authorization start request is received from the client.

12. The method according to claim 11, wherein in a case where the result of the authorization confirmation is received as the response to the authorization confirmation request at timing when the authorization start request is received from the client and it is confirmed that the result of the authorization conformation indicates approval, the access token issued in advance is caused to be transmitted.

13. A non-transitory storage medium that stores a program executable by an authorization server in a system including a resource server that provides a resource of a user, a client that accesses the resource, the authorization server that issues an access token indicating that access to the resource by the client is approved by the user, the program comprising:
a first reception step of causing the authorization server to receive an authorization start request that includes a resource identifier corresponding to the resource to be accessed by the client;
a transmission step of causing the authorization server to transmit, to the resource server, a resource owner request including the resource identifier included in the authorization start request received at the first reception step, wherein the resource owner request is made to resolve the user who is an owner of the resource corresponding to the resource identifier;
a second reception unit configured to receive, as a response to the resource owner request, information about the user from the resource server;
a specification step of causing the authorization server to specify terminal information associated with the received information about the user to request an authorization confirmation;
a confirmation step of causing the authorization server to transmit an authorization confirmation request to the terminal corresponding to the specified terminal information and receive, as a response, a result of authorization confirmation; and an issuance step of causing the authorization server to control issuance of the access token in accordance with the result of authorization confirmation received at the confirmation step and, in a case where the access token is issued, transmit the issued access token to the client that transmitted the authorization start request,
wherein, in response to receiving a notification of change of the owner of the resource, which is transmitted in a case where the resource is not able to be acquired by the client, the authorization server extracts an authorization request associated with the resource whose owner is changed, identifies new destination, and transmits an authorization confirmation request to the new destination.

14. The non-transitory storage medium according to claim 13 further comprising a storage step of causing the authorization server to store a user management table in which a user identifier and the terminal information are associated, wherein at the specification step, the user identifier is caused to be acquired as a response to the request and the terminal information associated with the acquired user identifier is caused to be specified based on the user management table.

15. The non-transitory storage medium according to claim 13, wherein in a case where the authorization confirmation request is transmitted to the user terminal corresponding to the specified terminal information, the authorization confirmation request is caused to be transmitted without access from the user terminal.

16. The non-transitory storage medium according to claim 13, wherein in a case where the authorization start request is received from the client that is not able to acquire the resource by using the issued access token, at the transmission step, the request that is made to resolve the user who is the owner of the resource is caused to be transmitted again to the resource server.

17. The non-transitory storage medium according to claim 13, wherein in a case where notification of change of the owner of the resource is received from the resource server, the authorization confirmation request is caused to be transmitted to the user terminal before the authorization start request is received from the client.

18. The non-transitory storage medium according to claim 17, wherein in a case where the result of the authorization confirmation is received as the response to the authorization confirmation request at timing when the authorization start request is received from the client and it is confirmed that the result of the authorization conformation indicates approval, the access token issued in advance is caused to be transmitted.

* * * * *